United States Patent [19]

Anderson et al.

[11] Patent Number: 4,551,986

[45] Date of Patent: Nov. 12, 1985

[54] TRANSPORT REFRIGERATION UNIT

[75] Inventors: Lowell M. Anderson, Bloomington; Rodney H. Volk, Eden Prairie, both of Minn.

[73] Assignee: Westinghouse Electric Corp., Pittsburgh, Pa.

[21] Appl. No.: 661,556

[22] Filed: Oct. 17, 1984

[51] Int. Cl.⁴ ............................................. B60H 3/04
[52] U.S. Cl. ...................................... 62/239; 62/244; 62/263
[58] Field of Search ......................... 62/239, 244, 263

[56] References Cited

U.S. PATENT DOCUMENTS

| | | | |
|---|---|---|---|
| 4,182,134 | 1/1980 | Viegas et al. | 62/263 X |
| 4,257,240 | 3/1981 | Christiansen et al. | 62/239 X |
| 4,348,871 | 9/1982 | Androff | 62/239 |
| 4,365,484 | 12/1982 | Carson et al. | 62/239 |

Primary Examiner—Lloyd L. King
Attorney, Agent, or Firm—E. C. Arenz

[57] ABSTRACT

The transport refrigeration unit (FIG. 5) includes a generally planar main frame 20, 22, 24 which supports a base frame 34 for carrying the compressor 54 and engine 56, and with an evaporator plenum 58 and a condenser plenum 60 in side-by-side, but spaced apart relation to provide a channel 62 therebetween. A heavy intermediate upper support member including wall 44 supports a bearing and support housing 68 which carries the shaft upon which is mounted, in cantilevered relation, both the evaporator blower 72 and the condenser blower 74. The plate fins 66 of the condenser are in planes parallel to the plane of the main frame with the air for the condenser entering the condenser plenum 60 from the side, rather than the front. With the arrangement as shown, all of the shafts carrying pulleys for the drive train to the blowers are parallel with each other.

11 Claims, 9 Drawing Figures

TRANSPORT REFRIGERATION UNIT

BACKGROUND OF THE INVENTION

This invention pertains generally to the art of transport refrigeration units and in particular to that part of the art relating to component and structural arrangements for such units.

As stated in applicants' assignee's U.S. Pat. No. 4,182,134, there are a number of obviously desirable characteristics which those in the business of manufacturing transport refrigeration units would like their units to have. As noted in that patent, some of these characteristics are a relatively small projection of the unit into the transport trailer, easy access for maintenance and service, manufacturability, light weight while having adequate structural strength and adequate refrigerant capacity for the intended service. The commercial unit according to that patent is considered to have those characteristics, but further improvements in component and structural arrangements are not precluded if a fresh look is taken at the desirable characteristics. The present invention is intended to provide a component and structural arrangement for such a unit which provides further improvements over those of the noted patent.

Among the improvements obtained with a design according to the invention is a better trailer interior airflow pattern compared to the present commercial unit. Also, the parts are so arranged as to simplify the blower drive arrangement through eliminating drive belt twists, and simplifying the belt tensioning arrangement. Another improvement is locating the evaporator and condenser coils close to the main support frame of the unit to permit a reduction in support material and unit weight. The overall packaging arrangement reduces the unit width about 5 inches relative to the commercial art predecessor, and also provides a smaller swing radius (the radius required to avoid the truck tractor from contacting the transport refrigeration unit as the tractor turns relative to the trailer, Finally, the design permits an electric standby motor option in which the motor is located within the confines of the cover and without requiring an add-on motor support tray under the unit, which is typical of the unit according to the patent.

SUMMARY OF THE INVENTION

In accordance with the invention, the transport refrigeration unit includes a compressor and a power pack including at least an internal combustion engine for driving the compressor, and includes a plate fin condenser and an evaporator, and has an arrangement and construction including a rectangular planar main frame including top, bottom and opposite side members and having a horizontal cross member at a level dividing the main frame into an upper major portion area and a lower minor portion area, with a forwardly projecting frame at the base of the main frame for supporting the engine and compressor forwardly of the lower minor portion area, and includes a forwardly projecting evaporator plenum and a condenser plenum in generally side-by-side, but spaced apart, relation in the upper portion area, the spaced apart relation defining a forwardly-open channel between the plenums, with a condenser blower and an evaporator blower on a common shaft extending horizontally and in a plane substantially parallel with the plane of the main frame, a shaft bearing and support housing for the shaft inside the evaporator plenum and supported by a plenum wall defining one side of the channel, the evaporator blower being located in the evaporator plenum, and the condenser blower being located in the channel and having an inlet in communication with the condenser plenum. The plates of the plate fin condenser are parallel with the plane of the main frame so that air flow through the condenser is from the side of the unit, rather than in through the front as is more common. The bearing and support housing for the shaft provides the sole support for the shaft so that both the fans are cantilever mounted. Belt tensioner means is located in the channel between the power pack and a pulley on the fan shaft, and is arranged to simultaneously tension the belt running from the belt tensioner to the fan shaft pulley, and the running from the tensioner to the power pack.

DESCRIPTION OF THE PREFERRED EMBODIMENT

Figure 1:
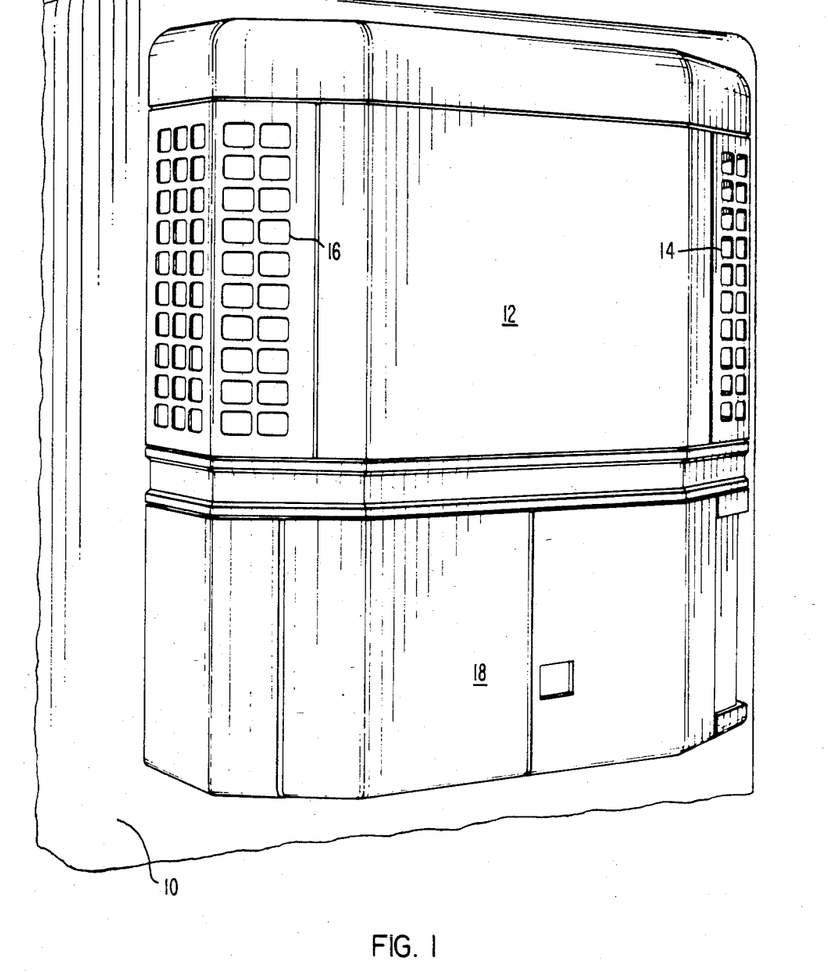
FIG. 1 is a perspective view of the transport refrigeration unit according to the invention mounted on the front of the trailer.

In FIG. 1, a fragmentary part of the front wall 10 of a trailer is shown with the transport refrigeration unit according to the invention mounted thereon. The upper cover portion 12 includes condenser air inlet grille 14 at the right and a symmetrically arranged grille 16 at the left serving as an air outlet. The lower cover portion 18 comprises a number of panels which are imperforate. Both of the panels 12 and 18 are either hingedly, or removably, connected to the main frame so that total front access to the parts behind the panels is available.

Figure 2:
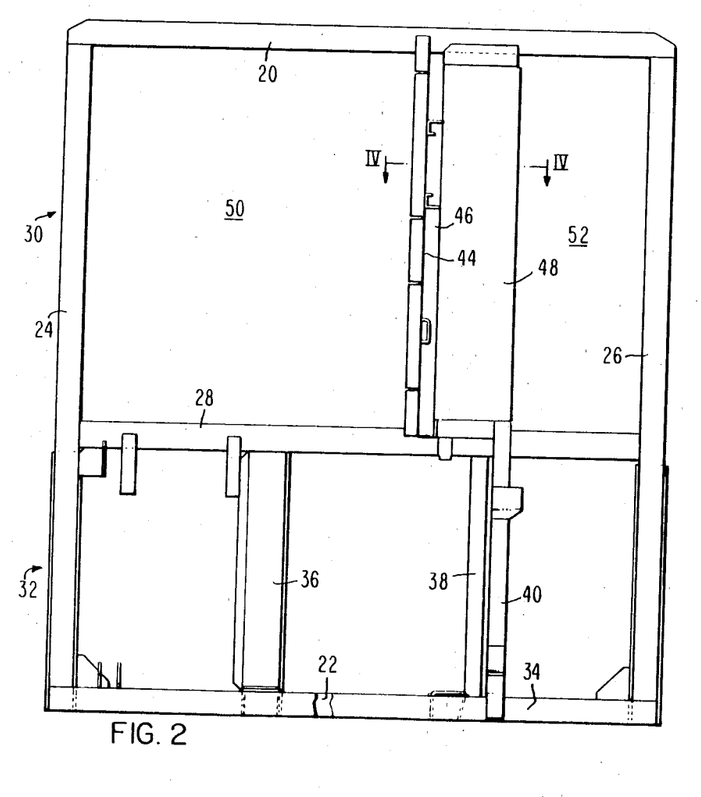
FIG. 2 is a front elevation view of the basic frame assembly.
Figure 3:
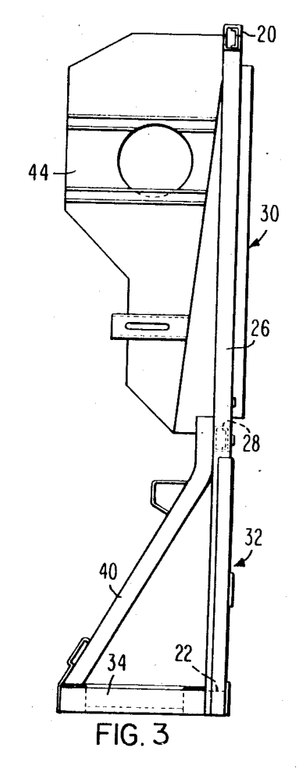
FIG. 3 is a side elevation of the basic frame.
Figure 4:
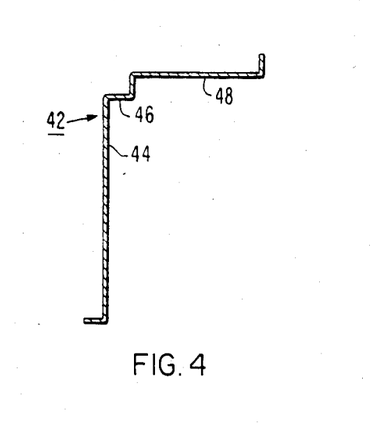
FIG. 4 is a sectional view of the center support member corresponding to one taken along the line IV—IV of FIG. 2.

Turning to FIGS. 2-4, the basic parts forming the rectangular main frame include top, bottom, opposite side, and intermediate cross members 20, 22, 24, 26, and 28, the intermediate horizontal cross member being located at a level dividing the main frame into an upper major portion area 30 and a lower minor portion area 32. A member 34 projects forwardly from the base of the planar part of the main frame and, as perhaps best seen in FIG. 5, has a shape in plan somewhat like a significantly flattened half circle. Additional stiffening and strengthening is provided to the frame by several vertical members 36 and 38 extending between the lower member 22 and the horizontal cross member 28, and further support at the right side for the base member 34 is provided by an inclined stiffener 40 (FIG. 3) extending between the cross member 28 and the forwardly projecting base member 34.

An important part of the frame as a whole is a vertically disposed, upper intermediate support member generally designated 42 (FIG. 4) which is of relatively heavy material and formed as viewed in section in FIG. 4. This intermediate support member extends between the top member 20 and intermediate horizontal cross member 28 and is formed to include a wall part 44, a right angle niche 46 which stiffens the member, and a rear wall 48.

As may be seen in FIG. 2, the vertical support member 42 separates the upper major portion of the frame into an area to the left of the wall 44 which, as will be explained, forms the right side wall of an evaporator plenum, and an area to the right of the wall 48 which will be termed as times herein as the condenser plenum area 52.

Figure 5:
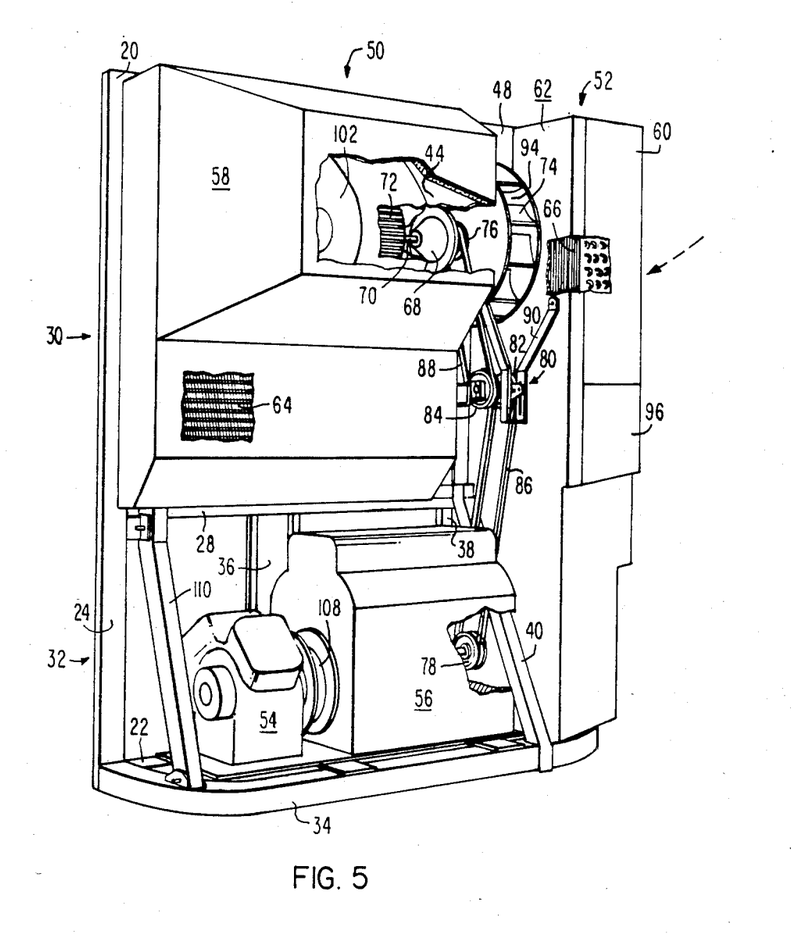
FIG. 5 is a perspective view from the front of the unit with certain parts omitted and other parts shown basically in outline form.

The general arrangement and location of the parts projecting forwardly from the planar main frame is shown in FIG. 5 in which many of the refrigeration circuit components are omitted, and in which certain parts such as the compressor 54 and engine 56 are shown in general outline form. An evaporator plenum 58 occupies the evaporator plenum space 50 referred to before and, in generally side-by-side, but spaced apart, relation thereto is the condenser plenum 60. Because of the spaced apart relation, the forwardly open channel 62 is defined between the two plenums. Both the evaporator 64 and the condenser 66 are plate fin and tube heat exchangers, the planes of the fins of the evaporator being perpendicular to the plane of the main frame, while the plate fins of the condenser 66 are parallel to that plane.

The evaporator plenum 58 is made as a subassembly out of sheet metal but with the right side being formed by the relatively heavy wall 44 of the intermediate support 42, this intermediate support member being formed of relatively heavier metal, such as, say, three times as thick as the sheet metal of the remainder of the plenum. This relatively heavy wall 44 supports a bearing and support housing 68 which is located within the evaporator plenum, the housing being supported from the wall 44. The bearing and support housing 68 carries a single shaft 70 which is horizontally disposed and in a plane parallel to the plane of the planar main frame, as well as parallel to the crankshafts (not shown) of the compressor 54 and motor 56. The shaft 70 projects both into the evaporator plenum 58 where it supports the evaporator blower 72 and into the channel 62 where it supports the condenser blower 74. A pulley 76 is mounted on the shaft 70 and is located in the channel 62 between the wall 44 of the evaporator plenum and the condenser blower 74.

Figure 6:
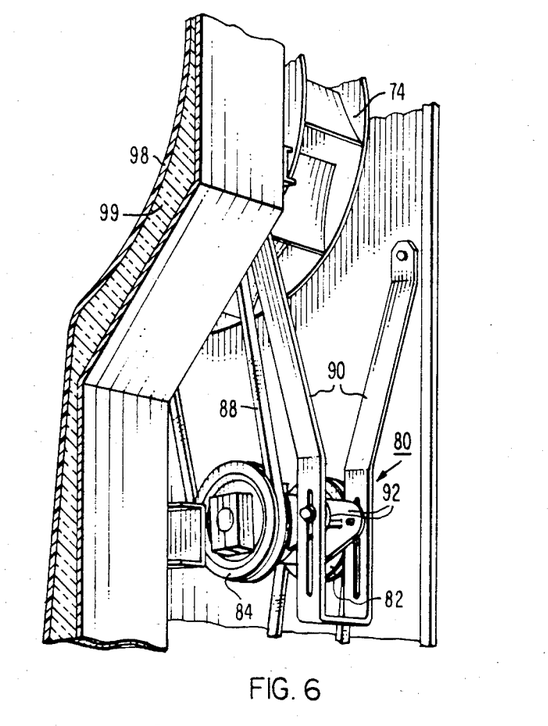
FIG. 6 is a fragmentary perspective view of the belt tensioner for a unit according to the invention.

In this arrangement shown, in which a single internal combustion engine is used, as distinct from an arrangement in which a standby electric motor is also available, the pulley 78 driven by the engine crankshaft provides power to the pulley 76 on the blower common shaft 70 through a belt tensioner generally designated 80 which includes an idler jackshaft with pulleys 82 and 84 thereon, the first being powered from belt 86 from the engine and the second delivering power through belt 88 to the blower shaft pulley, 76. The belt tensioner 80 is supported on a yoke or clevis arrangement, only one-leg 90 thereof shown in FIG. 5, this one leg being supported from the condenser plenum wall forming one side of the channel 62. The other leg 90 (FIG. 6) is rotatably supported from the wall 44 on the other side of the channel. With this support arrangement, the belt tensioner 80 may be moved forwardly or rearwardly in the channel 62 to simultaneously adjust the tension of the belts. The details by which the belt tensioning can be carried out is best seen in FIG. 6 in which it is seen that the two clevis legs 90 are attached by loosenable bolts to a pair of ears or lugs 92 on the belt tensioner housing.

With all of the pulleys in the power train from the engine 56 to the blower pulley 76 being in parallel planes, there is no requirement that the belts be twisted in passing from one pulley to another. This is a distinct advantage as is well known.

The general path of the condenser air flow is into the right hand side of the condenser plenum 60 (FIG. 5) as indicated by the dash line arrow, this air being admitted to the inside of the cover through the grille 14 (FIG. 1), with the condenser blower 74 drawing the air through the condenser and out of the plenum through the condenser plenum outlet opening 94 (FIG. 5), the air leaving the blower passing in part up the channel and out the open top of the cover, and in part downwardly over the engine and compressor, and exiting in part through the open bottom of the frame, and in part through the left hand grille 16 (FIG. 1) of the cover. The lower part of the condenser plenum 60 is occupied by the radiator 96 for the engine 56, so that part of the air which is drawn into the plenum passes over that radiator. The plate fins of the condenser, also designated 66 in FIG. 5, lie in planes parallel to the general plane of the main frame and, since the condenser air for the most part enters from the side of the cover, the air flow through the condenser does not require any significant change in direction. The side entrance of the condenser air is also considered to be advantageous with respect to some tractor-trailer arrangements in which a large wind deflector is mounted on the tractor, which could serve to partly starve a condenser coil mounted with a front facing air inlet.

Figure 7:
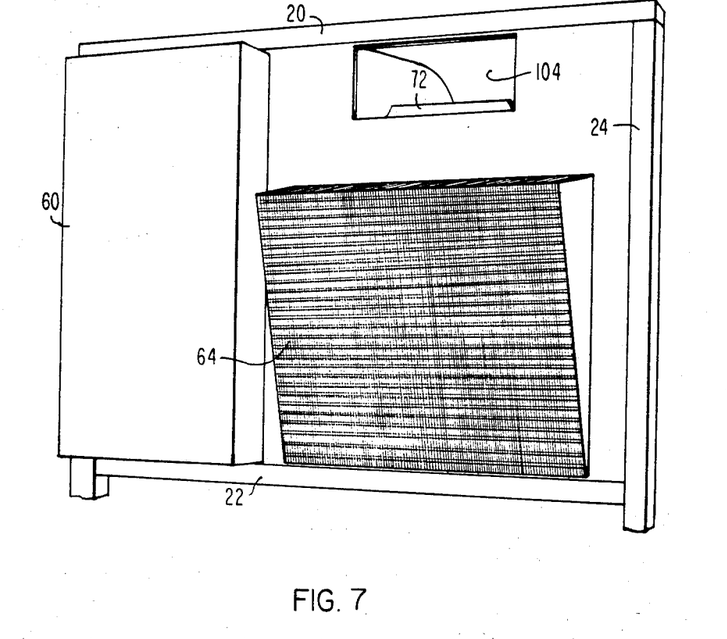
FIG. 7 is a slightly perspective face view of the rearward face of the unit as it would appear from inside the trailer.
Figure 8:
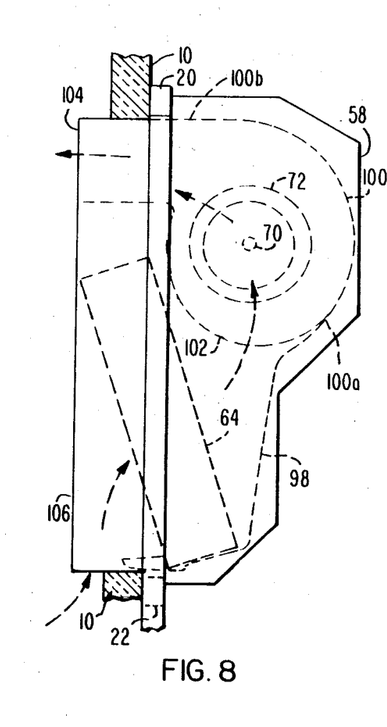
FIG. 8 is a partly diagrammatic side elevation of the evaporator plenum.
Figure 9:
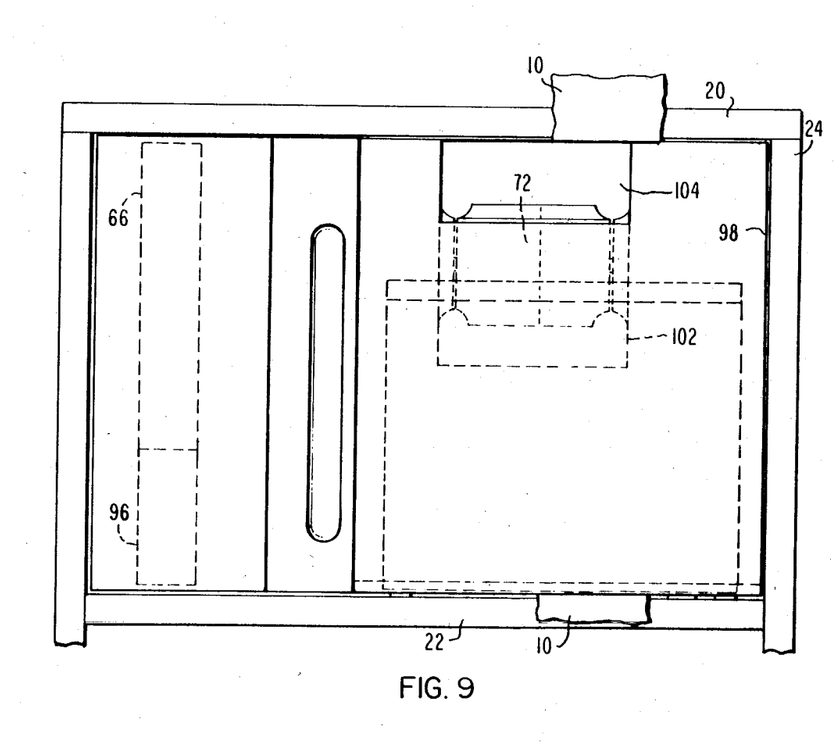
FIG. 9 is a partly diagrammatic elevation view of the rear face of the unit.

Referring to FIGS. 7-9, the evaporator coil 64 is inclined with its top tilted in toward the trailer interior.

In the currently preferred arrangement of the evaporator plenum, a plastic molded linear 98 (FIG. 8) is conformed to a shape basically complementary to the interior of the evaporator plenum but with a space between the interior liner and the outer shell of the plenum. Thermal material is foamed into the space to provide thermal insulation for the evaporator plenum. The molded plastic liner also includes a part 100 which extends from 100a to 100b to form a part of the back of the housing for the evaporator blower 72. The remainder of the blower housing is defined by formed aluminum sheets 102.

It will be noted from FIGS. 7 and 9 that the evaporator blower outlet 104 is not centered with respect to the total width of the unit. In the currently preferred arrangement, the left hand edge of the outlet (FIG. 9) is relatively close to the center of the total width of the unit, with the outlet width extending toward the right. As shown in FIG. 8, the unit as installed in the trailer has a back plate 106 which covers the face of the evaporator so that air returning from the trailer passes upwardly from the bottom to the upstream face of the evaporator coil, is drawn therethrough by the evaporator blower 72, which is a double width, double inlet blower, and then is discharged back into the trailer through the blower outlet 104. As is apparent from FIG. 8, the discharge into the trailer is directly from the blower housing rather than into an intermediate plenum and thence into the trailer. Both the off-center outlet, and the direct discharge into the trailer have been empirically assessed as improving the air distribution within the trailer.

While the unit has been described as having an upper evaporator discharge, by revamping the blower housing arrangement and the blower wheel relative thereto, reverse evaporator air flow is possible to give a downward discharge.

While not illustrated, the arrangement of components also lends itself to using an electric motor as the prime mover. In this case, the motor would be located in the area above the engine 56 (FIG. 5), and below the most forwardly projecting part of the evaporator plenum 58. The belt for driving the compressor would descend from one end of the electric motor to the clutch housing 108 while the opposite end of the motor shaft projecting into the area below the channel 62 would be provided with a pulley and a belt to connect to the belt tensioner 80.

The support of the forwardly projecting base frame 34 (FIG. 5) includes a left inclined support 110 which is detachable at its upper and lower ends to permit the removal of the compressor 54 alone without the engine 56.

What is claimed is:

1. In a transport refrigeration unit adapted to be mounted on the front face of a transport trailer or the like and having a power pack including at least an internal combustion engine for driving a refrigerant compressor, and including a plate fin refrigerant condenser and a refrigerant evaporator, a construction and structural arrangement of elements for the unit comprising:
   a rectangular planar main frame including top, bottom, and opposite side members and having a horizontal cross member at a level dividing the main frame into an upper major portion area and a lower minor portion area;
   forwardly projecting frame means at the base of said main frame for supporting said engine and compressor forwardly of said lower minor portion area, said engine and compressor being disposed with their crankshafts generally horizontal and parallel to the plane of said main frame;
   an evaporator plenum and a condenser plenum in generally side-by-side, but spaced apart, relation and projecting forwardly in said upper portion area, said spaced apart relation defining a forwardly-open channel between the plenums;
   a condenser blower and an evaporator blower on a common shaft extending horizontally and in a plane substantially parallel with the plane of said main frame;
   a bearing and support housing for said shaft inside said evaporator plenum and supported by the plenum wall defining one side of said channel;
   said evaporator blower being located in said evaporator plenum, and said condenser blower being located in said channel and having an inlet in communication with said condenser plenum.

2. An arrangement according to claim 1 wherein:
said plate fin condenser is disposed in said condenser plenum with the plate fins thereof being substantially parallel to the plane of said main frame so that air flow through said condenser is generally parallel to the plane of said main frame.

3. An arrangement according to claim 1 wherein:
said bearing and supporting housing provides the sole support for said shaft so that both said blowers are cantilever supported from the said housing.

4. An arrangement according to claim 3 including:
a blower pulley on said shaft;
a driving pulley driven by said power pack, said pulleys being in planes at least parallel to each other; and
belt means connecting said pulleys.

5. An arrangement according to claim 4 including:
belt tensioner means located in said channel intermediate said pulleys.

6. An arrangement according to claim 5 wherein:
said belt tensioner means comprises a pair of idler pulleys on a jackshaft;
said belt means comprises one belt between one of said pair and said blower pulley, and another belt between the other of said pulleys and said driving pulley; and
said belt tensioner means is supported for forward or rearward positional change for adjusting the tensions of the belts simultaneously.

7. An arrangement according to claim 2 wherein:
said evaporator is disposed in an inclined disposition in said evaporator plenum with its center of gravity relatively close to said plane of said main frame.

8. An arrangement according to claim 7 wherein:
said evaporator plenum includes a molded plastic interior liner, generally complementary in shape to the exterior of said evaporator plenum, but smaller, to provide a space between said liner and plenum exterior to receive thermal insulation.

9. An arrangement according to claim 8 wherein:
said liner includes a part thereof forming a part of the housing for said evaporator blower.

10. An arrangement according to claim 7 wherein:
said evaporator blower is a double-width, double-inlet blower in a scroll-shape blower housing having an outlet, said outlet being in direct communication with the interior of said trailer.

11. An arrangement according to claim 10 wherein:
said outlet has a greater width than height, said width being a minor portion of the width of said unit, and said outlet width is offset from the vertical centerline of said unit to a degree that at least the major portion of said outlet width is to the side of said centerline.

* * * * *

UNITED STATES PATENT AND TRADEMARK OFFICE
CERTIFICATE OF CORRECTION

PATENT NO.   :   4,551,986

DATED        :   November 12, 1985

INVENTOR(S) :   LOWELL M. ANDERSON, RODNEY H. VOLK

It is certified that error appears in the above-identified patent and that said Letters Patent is hereby corrected as shown below:

On the front data page, Item (73) "Assignee" should read as follows:

Thermo King Corporation
    Minneapolis
    Minnesota Signed and Sealed this Twenty-sixth Day of August 1986

[SEAL]

Attest:

DONALD J. QUIGG

Attesting Officer    Commissioner of Patents and Trademarks